June 9, 1925.
W. Z. SWIFT
TRACE SUPPORT
Filed Nov. 1, 1921
1,540,817
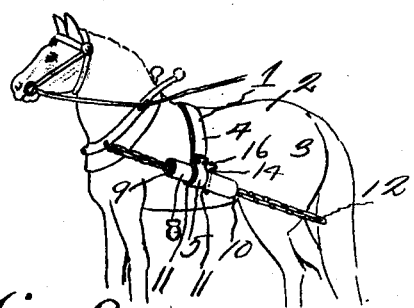
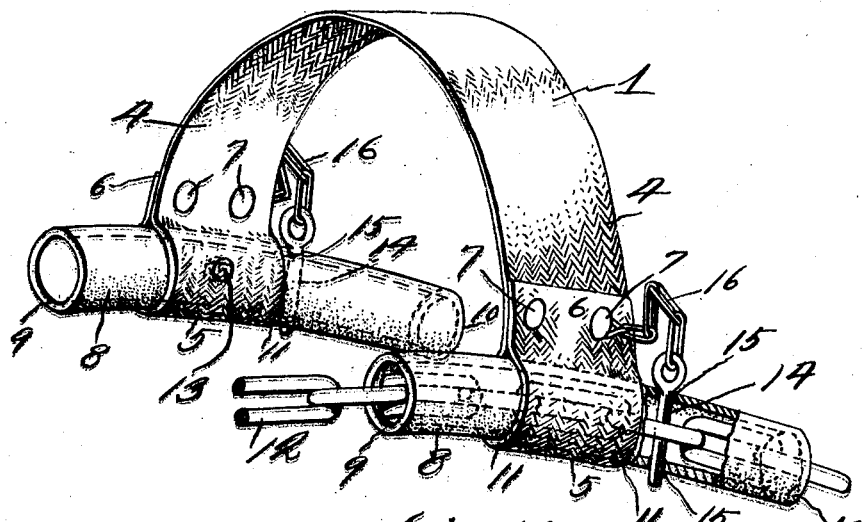
Inventor
W. Z. Swift
By
Attorney Patented June 9, 1925.

1,540,817

UNITED STATES PATENT OFFICE.

WILLIAM Z. SWIFT, OF BUCKNER, VIRGINIA.

TRACE SUPPORT.

Application filed November 1, 1921. Serial No. 512,024.

*To all whom it may concern:*

Be it known that I, WILLIAM Z. SWIFT, a citizen of the United States, residing at Buckner, in the county of Louisa, State of Virginia, have invented a new and useful Trace Support; and I do hereby declare the following to be a full, clear, and exact description of the invention, such as will enable others skilled in the art to which it appertains to make and use the same.

The invention relates to trace supporters and has for its object to provide a device of this character wherein the traces are supported spaced from the sides of an animal, and supported in elongated tubular members carried by the ends of a backband. Also to provide the backband with pins, which pins may be passed through apertures in the tubular members and through links of the traces thereby preventing displacement of the backband.

A further object is to sufficiently elongate the tubular members whereby the traces will be held from contact with the side of the animal and will not be exposed or allowed to contact with the side of the animal.

A further object is to provide a trace supporter comprising a flexible backband, the ends of which are bent upon themselves to form loops, in which loops elongated trace receiving and supporting members are received and held against longitudinal movement.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a horse showing the trace supporting device applied thereto.

Figure 2 is a perspective view of the trace supporting device.

Figure 3 is a top plan view of one side of the trace supporting device, showing the same supporting a trace spaced from the side of a horse.

Referring to the drawings, the numeral 1 designates a flexible backband adapted to extend over the back 2 of a draft animal 3. The ends 4 of the backband extend downwardly on each side of the draft animal and terminate in loops 5 formed by bending the material on itself and securing the ends 6 to the body of the band by means of rivets 7. Extending through the loops 5 are elongated tubular members 8, the ends 9 and 10 of which are spaced a substantial distance from the ends 11 of the loops 5, thereby providing means whereby the traces 12 will be maintained out of engagement with the outwardly curved sides 13 of the animal 3 as clearly shown in Figure 3. It will be seen that by elongating the tubular members 6 that the tubular member will not be imbedded or forced inwardly in such a manner as to compress the flesh of the animal and allow the chains forming the traces 12 to engage the side of an animal, which would be the case if a short tubular member were used. It will be seen that as the animal tugs on the traces 12, that the elongated tubular members 8 will maintain the traces out of engagement with the sides of the animal thereby preventing rubbing of the sides of the animal and consequently the formation of sores. The elongated members 8 are secured in the loops 5 by means of rivets 13.

The elongated members 8 and the back band 1 are held against displacement on the animal's back, by means of a pin 14, which pin passes through oppositely disposed apertures 15 in the elongated members and through links of the traces. It will be seen that by providing the pins which a have a flexible connection 16 with the band 1, that the use of means for preventing displacement of the tubular members 8 and the backband 1 is obviated and that the pins and traces will maintain said tubular members and backband in place at all times. By providing the pins it will also be seen that the tubular members 8 and the backband 1 will be held in any position to which they have been adjusted.

From the above it will be seen that a trace supporter is provided which is simple in construction and may be cheaply constructed, and one which is positive in its operation. If so desired the tubular members 8 may be formed from flexible material, such for instance rubber tubing having fabric imbedded therein.

The invention having been set forth what is claimed as new and useful is:—

A trace supporter comprising a backband, loops carried at the ends of said backband, elongated tubular members secured in said loops, pins secured to the back band by means of pliable members, said pins extending through apertures in the tubular members and forming means for holding traces against movement in the tubular members.

In testimony whereof I have signed my name to this specification in the presence of two subscribing witnesses.

WILLIAM Z. SWIFT.

Witnesses:
N. R. H. COOKE,
J. N. COOKE.